(12) United States Patent
Neff

(10) Patent No.: US 6,965,187 B2
(45) Date of Patent: Nov. 15, 2005

(54) ROTOR

(75) Inventor: Ueli Neff, Appenzell (CH)

(73) Assignee: ALSTOM Technology Ltd., Baden (CH)

( * ) Notice: Subject to any disclaimer, the term of this patent is extended or adjusted under 35 U.S.C. 154(b) by 57 days.

(21) Appl. No.: 10/847,474

(22) Filed: May 18, 2004

(65) Prior Publication Data

US 2004/0263023 A1 Dec. 30, 2004

Related U.S. Application Data

(63) Continuation of application No. PCT/IB02/04720, filed on Nov. 12, 2002.

(30) Foreign Application Priority Data

Nov. 22, 2001 (EP) .............................. 01127822

(51) Int. Cl.⁷ ................................. H02K 1/22
(52) U.S. Cl. ....................... 310/261; 310/218
(58) Field of Search ............... 310/91, 216–218, 310/261

(56) References Cited

U.S. PATENT DOCUMENTS

| | | | | |
|---|---|---|---|---|
| 3,187,213 A | * | 6/1965 | Seidl et al. ............ | 310/209 |
| 3,387,152 A | * | 6/1968 | Johannes ................ | 310/89 |
| 3,935,490 A | * | 1/1976 | Spirk ................... | 310/91 |
| 4,128,780 A | | 12/1978 | Sonobe | |
| 4,143,457 A | * | 3/1979 | McGahern .............. | 29/598 |
| 4,258,280 A | | 3/1981 | Starcevic | |
| 5,635,785 A | | 6/1997 | Schwanda et al. | |

FOREIGN PATENT DOCUMENTS

| | | |
|---|---|---|
| DE | 1 130 915 | 6/1962 |
| DE | 1 196 779 | 7/1965 |
| DE | 1 538 704 | 2/1970 |
| DE | 2 229 506 | 12/1972 |
| DE | 28 52 980 | 6/1980 |
| EP | 0 334 020 A1 | 9/1989 |
| FR | 2.154.548 | 5/1973 |
| JP | 61269625 | 11/1986 |
| WO | 03/044925 | 5/2003 |

OTHER PUBLICATIONS

Search Report from PCT/IB 02/04720 (Feb. 6, 2003).
Search Report from EP 01 12 7822 (Apr. 23, 2002).

* cited by examiner

*Primary Examiner*—Thanh Lam
(74) *Attorney, Agent, or Firm*—Cermak & Kenealy, LLP; Adam J. Cermak

(57) ABSTRACT

In the case of a rotor (10) having a rotor spider (11), which is mounted such as it can rotate about an axis (15) and has two or more ribs (12), and having a laminated rim (14), which concentrically surrounds the rotor spider (11) and is composed of individual rim laminates (16), and which is connected to the rotor spider (11) by means of wedges (13) via a laminated rim wedge system, a simplified connection between the laminated rim (14) and the rotor spider (11) is achieved in that the wedges (13) and the rim laminates (16) are designed such that they engage in one another in an interlocking manner, forming a rigid connection.

7 Claims, 2 Drawing Sheets

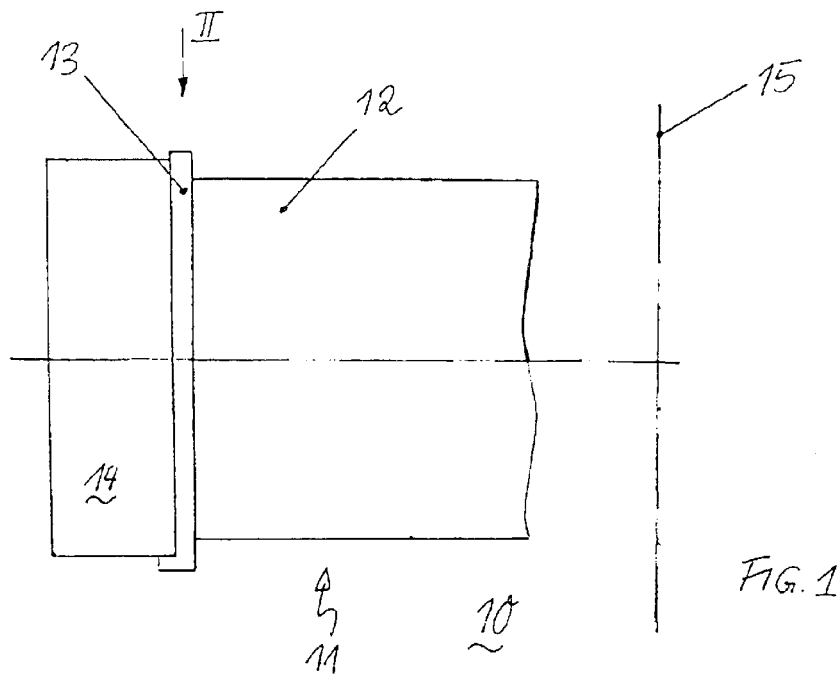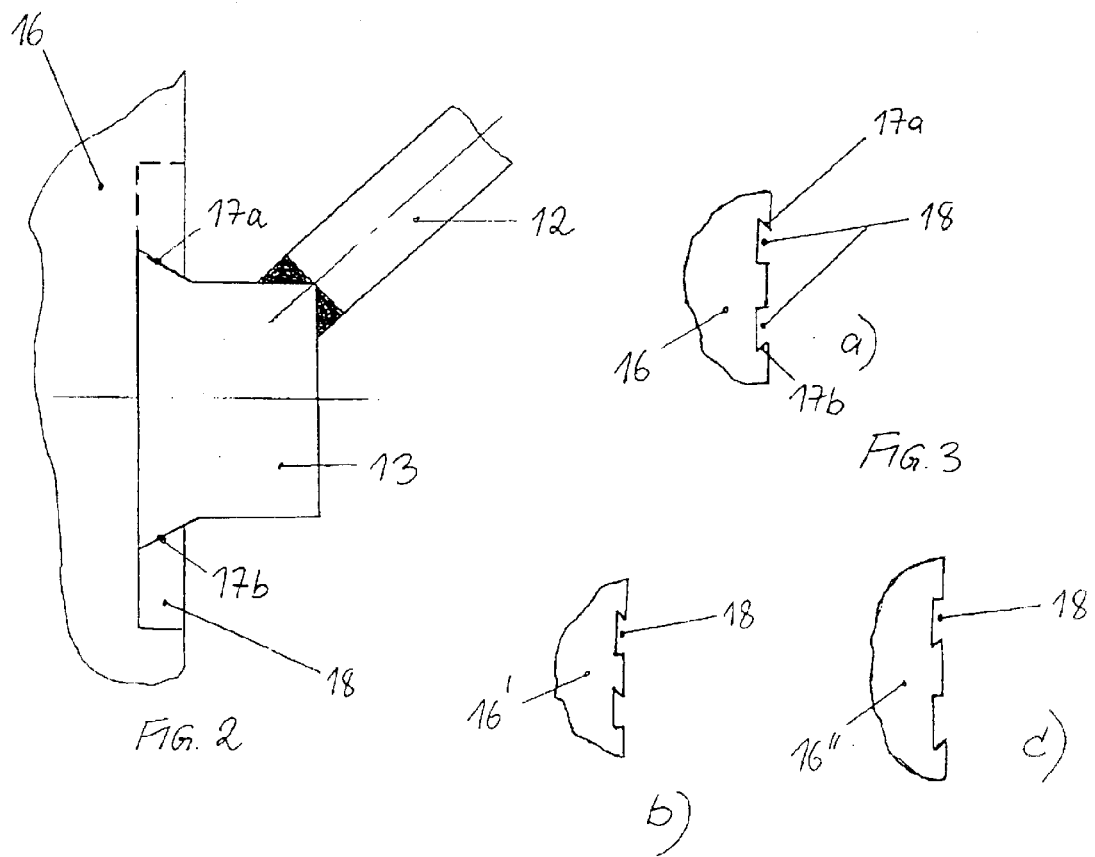

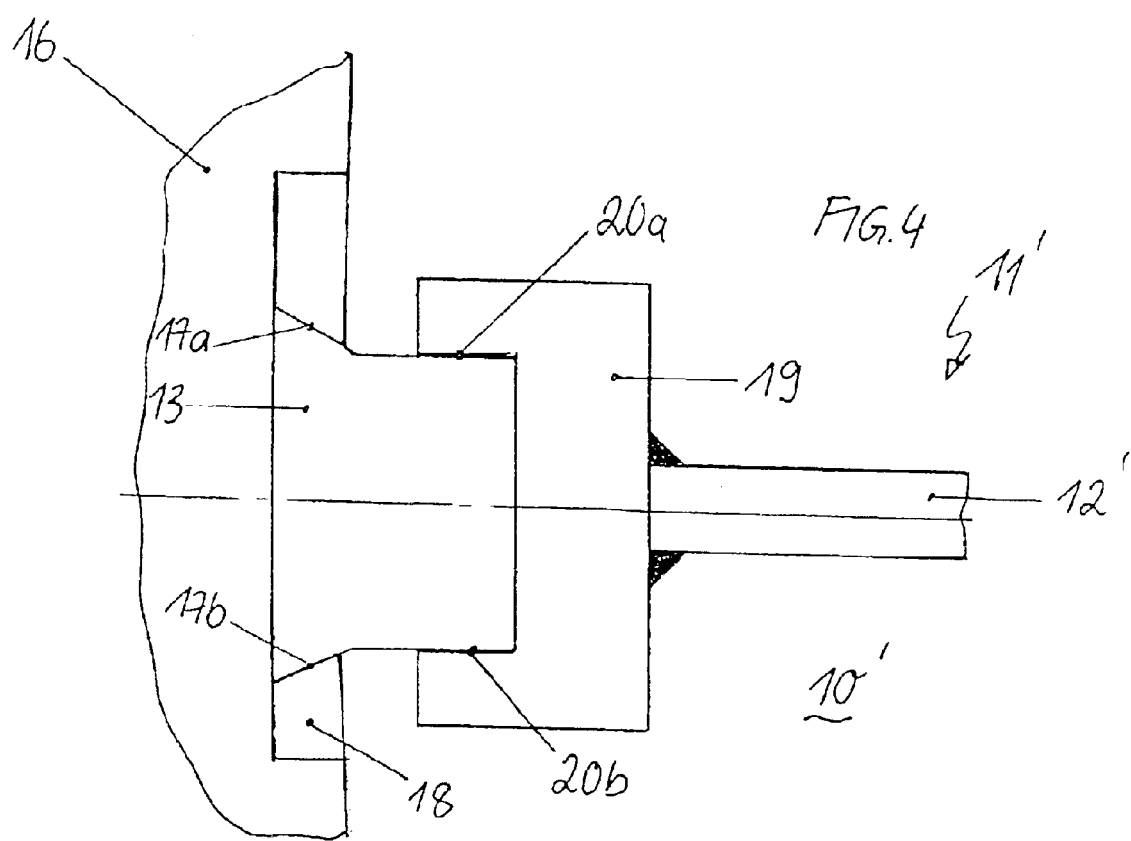

ROTOR

This application is a Continuation of and claims priority under 35 U.S.C. § 120 to International application number PCT/IB02/04720, filed 12 Nov. 2002, and claims priority under 35 U.S.C. § 119 to European application number 01127822.3, filed 22 Nov. 2001, the entireties of both of which are incorporated by reference herein.

BACKGROUND OF THE INVENTION

1. Field of the Invention

The present invention relates to the field of electrical machines, and in particular to a rotor.

A rotor such as this is known, for example, from the document DE-A1-28 52 980.

2. Brief Description of the Related Art

In the case of rotors such as those which are known from the initially cited DE-A1-28 52 980, EP-A1-0 334 020 or U.S. Pat. No. 4,143,457, a laminated rim which is formed from individual layers of rim laminates is connected by wedging to a rotor spider which is mounted such that it can rotate about a central axis. Depending on the way in which the rotor spider is produced, the laminated rim wedge system generally comprises a wedge support, a wedge and one or more mating wedges (see, for example, EP-A1-0 334 020 or U.S. Pat. No. 4,143,457). The rotor spider is a rigid structure in the area of the connection for the laminated rim, comprising two or more disks, the radial ribs (which may also be arranged tilted or obliquely when seen from the radial direction) and the wedge supports (see, for example, FIG. 2 in DE-A1-28 52 980). The ribs are welded to the disks and to the wedge supports and therefore cannot function as oblique elements in the area of the connection to the laminated rib, even if they are arranged obliquely. The wedge is rigidly connected to the laminated rim by a friction lock by means of the mating wedge (or the mating wedges).

The rim laminates have rectangular cutouts in order that the wedge and mating wedge or wedges can be accommodated. Two or more cutouts may be provided in the rim laminate. One or more wedges may also engage per laminate. The wedge and wedge support can move relative to one another. This is important because, if there were no capability for relative movement, the mechanical load on the rotor spider and on the rotor rim would be too high during operation (centrifugal force, different temperature distribution in the laminated rim and rotor spider).

The known laminated rim wedge system has the disadvantage on the one hand of the relatively major design and manufacturing complexity resulting from the wedge supports, the wedges and the mating wedges. On the other hand, the sliding movements between the wedge and the wedge supports can be controlled only with difficulty in practice. Finally, the laminated rim is quite often shrunk onto the rotor spider (see, for example, U.S. Pat. No. 4,143,457). However, the shrinking process results in high mechanical stresses being induced in the rotor spider when the rotor is at rest, which makes it necessary to design the rotor spider to be stiffer and more expensive.

SUMMARY OF THE INVENTION

The object of the invention is therefore to provide a rotor with a laminated rim wedge system, which avoids the disadvantages of known solutions and is distinguished in particular by simplified design and simplified manufacture.

The essence of the invention is to design the wedges and the rim laminates such that they engage in one another in an interlocking manner, forming a rigid connection. This means that there is no need to carry out complicated splitting processes into wedges and mating wedges, and the connection between the laminated rim and the wedges is considerably simplified.

One preferred refinement of the rotor according to the invention is distinguished in that the wedges are in the form of dovetails on the side facing the laminated rim, and in that the rim laminates have cutouts in which the dovetail shape of the wedges engages forming a rigid connection.

The rim laminates in this case preferably each have two or more cutouts, and each of the cutouts is bounded on one side by a contact flank in the form of a dovetail and on the other side by a flank which is arranged at right angles.

In a first development of the preferred refinement, the rotor spider has oblique ribs, and the wedges are firmly connected to the ribs, in particular by welding.

In a second development of the preferred refinement, the rotor spider has radial ribs, wedge supports are attached to the ribs, and the wedges are mounted in the wedge supports such that they can slide.

BRIEF DESCRIPTION OF THE DRAWINGS

The invention will be explained in more detail in the following text with reference to exemplary embodiments in conjunction with the drawing, in which:

FIG. 1 shows a side view of a detail of a rotor with oblique ribs according to a first exemplary embodiment of the invention;

FIG. 2 shows a plan view from above of the rotor shown in FIG. 1,

FIG. 3 shows various examples, in figure elements (a) to (c), of the design of the rim laminates for the rotor illustrated in FIG. 2; and FIG. 4 shows an illustration, comparable to that shown in FIG. 2, of a second exemplary embodiment of the rotor according to the invention, with radially oriented ribs.

DETAILED DESCRIPTION OF THE PREFERRED EMBODIMENTS

FIGS. 1 and 2 show, respectively, a side view and a plan view from above of a detail of a rotor according to a first preferred exemplary embodiment of the invention for rotor rims with obliquely running spokes (ribs). The rotor 10, which can rotate about an axis 15, has a rotor spider 11 with two or more ribs 12 which project obliquely outwards and are each connected by means of wedges 13 to a laminated rim 14, which is formed from individual rim laminates 16, 16', 16" (FIG. 3). The laminated rim 14 surrounds the rotor spider 11 concentrically. The novel laminated rim wedge system now in each case comprises only one wedge 13, which has a dovetailed shape (FIG. 2). In contrast to the known solution, the rim laminates 16, 16', 16" have cutouts 18, one flank of which, as before, has a rectangular shape, while its other flank is in the form of a dovetail (FIGS. 3(a) to (c)). Only this contact flank (17a, b in FIG. 2) can be used for the connection between the rim laminate 16 and the wedge 13. There may be two or more cutouts 18 in the rim laminate 16, 16', 16". In addition, one or more wedges 13 may engage per rim laminate.

In the simplest case, the rim laminate is designed as shown in FIG. 3(a) (rim laminate 16). The laminated rim 14 is formed by mutual lamination of the rim laminates 16. If necessary, the rim laminate may also be formed as shown in FIG. 3(b) (rim laminate 16'). In this case, in addition to the mutual lamination, the rim laminate is also reversed while the laminates are being formed into layers on top of one another (rim laminate 16" in FIG. 3(c)). Fundamentally, any variation may be used (two or more cutouts 18, contact flank 17a, b on the left or right, one or more wedges engaged per rim laminate).

The fundamental principle in this case is always that the rigid connection between the wedge 13 and the laminated rim 14 comes to rest (due to the shape of the rim laminates and due to the choice of the lamination) on both the left and right contact flanks 17a, b of the wedge 13. The rim laminates 16, 16', 16" may either be stamped or cut by lasers. The rotor spider 11 is formed in the area of the connection for the laminated rim 14 from obliquely arranged ribs 12, which have to be rigidly connected to the wedge 13 (for example by welding). There is no need for the disks which can be seen in the area of the connection between the laminated rim and the rotor spider in FIG. 1 in DE-A1-28 52 980. This arrangement is the only way for the ribs 12 also to actually act as oblique elements and to reduce the mechanical load in the wedge 13 and laminated rim 14 during operation of the rotor 10 (centrifugal force, different temperature distribution in the laminated rim 14 and in the rotor spider 11).

The advantages of the novel laminated rim wedge system as shown in FIGS. 1–3 are:

no expensive wedge support with a wedge and mating wedge required;

simple connection between the laminated rim and the wedge;

no further sliding movements possible, which are difficult to cope with;

the rigid connection between the laminated rim and the rotor spider means that there is no need for the shrinking of the laminated rim, which is sometimes required.

The exemplary embodiment explained above operates only for an oblique connection between the laminated rim 14 and the rotor spider 11 (oblique ribs 12).

A further preferred exemplary embodiment is illustrated in FIGS. 4 and 5. The laminated rim wedge system between the rotor spider 11' and the laminated rim in the case of this rotor 10' in each case comprises a wedge support 19 which has the same shape as, for example, the wedge system that is known from DE-A1-28 52 980, and a wedge 13 which is identical to that in FIG. 2. The rigid connection between the laminated rim and the wedge 13 is analogous to that shown in FIG. 2, and the shape of the rim laminates 16 (or 16', 16") is the same as in FIG. 3. The rotor spider 11' differs from the rotor spider 11 shown in FIG. 2 in that the ribs 12' are radial. This on the one hand results in the conventional type of wedge system (with a wedge and a mating wedge or wedges) being replaced, while on the other hand the wedge 13 and the wedge support 19 can move relative to one another along sliding surfaces 20a,b. Thus, in this exemplary embodiment, the rigid connection by means of a dovetailed wedge is combined with the wedge being mounted in the wedge support such that it can slide.

This exemplary embodiment does not work in the case of an oblique connection between the laminated rim and the rotor spider (oblique ribs).

LIST OF REFERENCE SYMBOLS 10, 10' Rotor
11, 11' Rotor spider
12, 12' Rib
13 Wedge
14 Laminated rim
15 Axis
16, 16', 16" Rim laminate
17a,b Contact flank
18 Cutout (rim laminate)
19 Wedge support
20a,b Sliding surface While the invention has been described in detail with reference to preferred embodiments thereof, it will be apparent to one skilled in the art that various changes can be made, and equivalents employed, without departing from the scope of the invention. Each of the aforementioned documents is incorporated by reference herein in its entirety.

What is claimed is:

1. A rotor comprising:

a rotor spider mounted to rotate about an axis, the rotor spider including at least two ribs;

a laminated rim which concentrically surrounds the rotor spider and comprises individual rim laminates;

a laminated rim wedge system including wedges;

wherein the laminated rim is connected to the rotor spider by the wedges of the laminated rim wedge system;

wherein the wedges and the rim laminates are configured and arranged to interlockingly engage in one another and to form a rigid connection; and wherein the wedges comprise dovetails on a side facing the laminated rim, and wherein the rim laminates comprise cutouts in which said dovetails engage to form a rigid connection.

2. The rotor as claimed in claim 1, wherein the rim laminates each have at least two cutouts, and wherein each of the cutouts is bounded on one side by a contact flank comprising a dovetail and on the other side by a flank arranged at right angles.

3. The rotor as claimed in claim 2, wherein the dovetail contact flanks are arranged on the same side in the cutouts in the rim laminates and the rim laminates in the laminated rim are arranged in a mutually laminated form and alternatingly reversed in layers on top of one another.

4. The rotor as claimed in claim 2, wherein the dovetail contact flanks are arranged on alternate sides in the cutouts in the rim laminates, and the rim laminates are arranged in a mutually laminated form in layers on top of one another in the laminated rim.

5. The rotor as claimed in claim 1, wherein the rotor spider comprises oblique ribs, and the wedges are firmly connected to the oblique ribs.

6. The rotor as claimed in claim 1, wherein the rotor spider comprises radial ribs, and further comprising:

wedge supports attached to the radial ribs; and wherein the wedges are slidingly mounted in the wedge supports.

7. The rotor as claimed in claim 5, wherein the wedges are welded to the ribs.

* * * * *